United States Patent
Qin et al.

(10) Patent No.: US 11,090,718 B2
(45) Date of Patent: Aug. 17, 2021

(54) METHOD BASED ON FLUIDIZING FOR MODIFYING AND PREPARING LOW-COST TITANIUM POWDERS FOR 3D PRINTING

(71) Applicant: University of Science and Technology Beijing, Beijing (CN)

(72) Inventors: Mingli Qin, Beijing (CN); Gang Chen, Beijing (CN); Wangwang Ding, Beijing (CN); Xuanhui Qu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 16/624,916

(22) PCT Filed: Sep. 30, 2019

(86) PCT No.: PCT/CN2019/109538
§ 371 (c)(1),
(2) Date: Dec. 20, 2019

(87) PCT Pub. No.: WO2020/103582
PCT Pub. Date: May 28, 2020

(65) Prior Publication Data
US 2020/0406352 A1    Dec. 31, 2020

(30) Foreign Application Priority Data

Nov. 23, 2018   (CN) .......................... 201811408679.2

(51) Int. Cl.
*B22F 1/00*      (2006.01)
*B33Y 70/00*    (2020.01)

(52) U.S. Cl.
CPC .......... *B22F 1/0085* (2013.01); *B22F 1/0011* (2013.01); *B22F 1/0048* (2013.01);
(Continued)

(58) Field of Classification Search
CPC ........ B22F 1/0081; B22F 1/0085; B22F 1/00; B22F 1/0003; B22F 1/0007; B22F 1/0048;
(Continued)

(56) References Cited

U.S. PATENT DOCUMENTS

2016/0221084 A1*  8/2016  Klecka ................... B01J 2/16
2019/0217389 A1*  7/2019  Parrish ................. B22F 1/0048

FOREIGN PATENT DOCUMENTS

CN    104525956 A    4/2015
CN    105562700 A    5/2016
(Continued)

OTHER PUBLICATIONS

"Yigit Karpat, Temperature dependent flow softening of titanium alloy Ti6Al4V: An investigation using finite element simulation of machining, 2010, Journal of Materials Processing Technology, 211, 737-749" (Year: 2010).*

*Primary Examiner* — Rebecca Janssen
(74) *Attorney, Agent, or Firm* — Bayramoglu Law Offices LLC

(57) ABSTRACT

A method based on fluidizing for modifying and preparing low-cost titanium powders for 3D printing includes: using hydrogenated-dehydrogenated irregularly-shaped titanium powders as the raw material, adding the titanium powders to a fluidized bed reactor, and introducing Ar or $H_2$ at the flow rate of 0.5-1.5 L/min, heating the reactor to 300-700° C., and fluidizing for 5-90 min to modify the titanium powders. When filled with high-purity argon gas and heated at high temperature, the sharp edges and corners of irregularly-shaped titanium powders are ground collision of the particles due to the friction among powder particles.

1 Claim, 2 Drawing Sheets

(52) U.S. Cl.
CPC ..... *B22F 2201/013* (2013.01); *B22F 2201/11* (2013.01); *B22F 2301/205* (2013.01); *B33Y 70/00* (2014.12)

(58) Field of Classification Search
CPC .............. B22F 2301/00; B22F 2301/20; B22F 2301/205; B22F 9/00; B22F 9/04; B22F 1/0011; B22F 2201/013; B22F 2201/11; B01J 2/00; B01J 2/16; B33Y 70/00
See application file for complete search history.

(56) References Cited

FOREIGN PATENT DOCUMENTS

| | | | |
|---|---|---|---|
| CN | 106714973 | A | 5/2017 |
| CN | 107511118 | A | 12/2017 |
| CN | 108080621 | A | 5/2018 |
| CN | 108192190 | A | 6/2018 |
| CN | 108788129 | A | 11/2018 |
| KR | 100718912 | B1 * | 5/2007 |
| WO | 9730797 | A1 | 8/1997 |

* cited by examiner

METHOD BASED ON FLUIDIZING FOR MODIFYING AND PREPARING LOW-COST TITANIUM POWDERS FOR 3D PRINTING

CROSS REFERENCE TO THE RELATED APPLICATIONS

This application is the national phase entry of International Application No. PCT/CN2019/109538, filed on Sep. 30, 2019, which is based upon and claims priority to Chinese Patent Application No. 201811408679.2, filed on Nov. 23, 2018, the entire contents of which are incorporated herein by reference.

TECHNICAL FIELD

The present invention belongs to the technical field of metal powder metallurgy preparation and provides a method based on fluidizing for modifying and preparing low-cost titanium powders for 3D printing.

BACKGROUND

Titanium is the metal with low density, good corrosion resistance, high specific strength and excellent biocompatibility, which has been mainly used in aerospace, petrochemical, energy, biomedical and other fields. In recent years, preparing high-performance and complex-shaped titanium products by using powder metallurgy near-net-shape forming processes such as 3D printing and injection molding has become a worldwide research topic. Powder metallurgy requires titanium powders raw materials to have good properties. Properties such as particle size, composition, and oxygen content, are all important, yet a particular emphasis is placed on the powder flowability. The powder flowability directly affects the powder molding quality, such as the powder spreading uniformity during 3D printing or the powder loading rate (amount) in the feeding of injection molding, etc., which is related to the overall performance of final products. Therefore, powder metallurgy processes such as 3D printing and injection molding generally use spherical titanium powders with good powder flowability as the raw material. The spherical titanium powders is mainly produced by inert gas atomization, plasma rotating electrode atomization, plasma atomization, and plasma spheroidization, etc. The titanium powders produced by these processes exhibit higher sphericity, lower impurity content, and better flowability, as compared to the irregularly-shaped powders. However, the method for preparing the above spherical titanium powders requires complicated equipment and processing, along with high production cost (currently, producing spherical titanium and titanium alloy powders for 3D printing or injection molding costs over 300 USD/kg). The high price has become a key factor limiting the widespread application of powder metallurgy titanium products. Therefore, it is imperative to develop a titanium powders preparation or processing technique with low cost, simple process, controllable impurity content, and good flowability, which meets the requirements of powder metallurgy process.

SUMMARY

The objective of the present disclosure is to provide a method for preparing titanium powders at a low cost, where the titanium powders has a good sphericity and flowability and is usable in powder metallurgy processes such as 3D printing and injection molding. The present disclosure solves the problems exist in current spherical titanium powders production, including strict equipment conditions, complicated processing, and high cost, etc.

In the present disclosure, the fluidization technique is applied to the modification of irregularly-shaped powders for the first time. The fluidization technique achieves the results, such as surface treatment, drying, and heat and mass transport by solid particles and gas or liquid fluid media moving and contacting each other in a container which has been widely used in chemical, light industry, medicine, food and other fields. In the present invention, the hydrogenated-dehydrogenated irregularly-shaped titanium powders, as the raw material, are placed in a fluidized bed reactor where collision and friction occur among the titanium powders at a predetermined temperature in a protective atmosphere, thereby modifying the titanium powders, improving the powder sphericity, achieving the titanium powders with good flowability, and meeting the requirements of powder metallurgy processes such as 3D printing and injection molding. This method has the advantages of low cost, simple equipment and process, high efficiency, controllable impurity content, and greatly-improved powder flowability, which may also be used as a modification treatment for other metallic powders.

A method based on fluidizing for modifying and preparing low-cost titanium powders for 3D printing (see FIG. 1) includes the following specific steps:

(1) using a hydrogenated-dehydrogenated irregularly-shaped titanium powders as the raw material, adding the titanium powders to a fluidized bed reactor, and introducing a predetermined amount of gas (Ar or $H_2$) into the fluidized bed reactor from bottom to top to remove air in the fluidized bed reactor and provide a gas protective environment for the powders;

(2) after the air is exhausted from the fluidized bed reactor, transferring the fluidized bed reactor to a heating system, during the fluidization process, continuously introducing a stable flow of gas (Ar or $H_2$) at the flow rate of 0.5-1.5 L/min, raising the temperature to 300-700° C., and fluidizing at the constant temperature for 5-90 min. Titanium powders particles are suspended in the reactor during the fluidization process due to the action with the gas flow, which causes the collision and friction among the particles, causing the modification of surface morphology and particle size distribution to change; and (3) after the fluidization is completed, the fluidized bed reactor is removed from the heating system. Afterwards, the reactor is cooled in the air, stopping the protective gas, and collecting and packaging the treated titanium powders. The present invention uses the fluidization technique to modify the titanium powders for the first time, which has the advantages of low cost, controllable oxygen content, and well modified powders, with the following specificities:

(1) Low cost. Using hydrogenated-dehydrogenated irregularly shaped titanium powders as the raw material reduces the cost of raw material. Modifying the irregularly-shaped titanium powders by the fluidized bed process requires simple equipment and process, and reaches high efficiency and low processing cost. The yield of titanium powders is close to 100%, which further reduces the production cost.

(2) Free of contamination and controllable oxygen content. The protective atmosphere is used in the fluidization process, which effectively reduces the risk of contaminating titanium powders in a high-temperature fluidized environment. Moreover, the content of impurities, such as oxygen in the titanium powders after the modification, is effectively controlled.

(3) Good flowability of the powder particles. The collision and friction occur between powder particles during a fluidized modification, thus polishing the sharp edges and corners of the irregularly shaped titanium powders. The flowability of the achieved titanium powders is effectively improved and is better than 30 s/50 g, which can meet the requirements of powder metallurgy near-net-shape forming processes such as 3D printing and injection molding.

TABLE 1

Flowability and oxygen increment of titanium powders after fluidization at different temperatures (relative to the original titanium powders)

| Embodiment | Processing temperature | Flowability (s/50 g) | Oxygen increment (wt. %) |
|---|---|---|---|
| 1 | 450° C. | 15.11 | 0.04 |
| 2 | 500° C. | 12.67 | 0.16 |
| 3 | 550° C. | 14.16 | 0.45 |
| 4 | 600° C. | 28.54 | 1.16 |

DETAILED DESCRIPTION OF THE EMBODIMENTS

Embodiment 1

Figure 1:
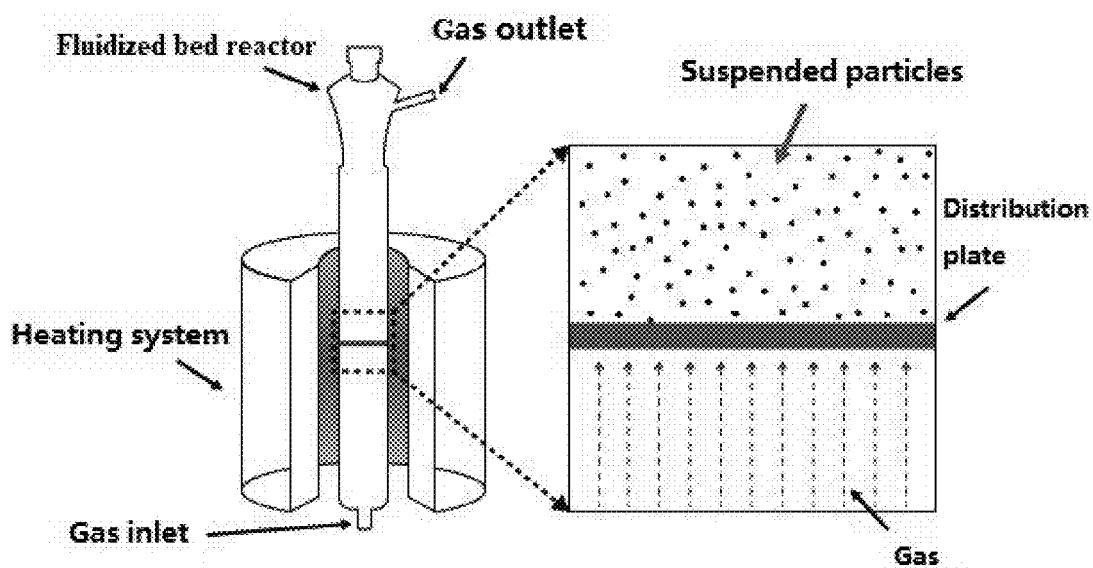
FIG. 1 is a schematic diagram of the device and the process for fluidizing titanium powders.
Figure 2:
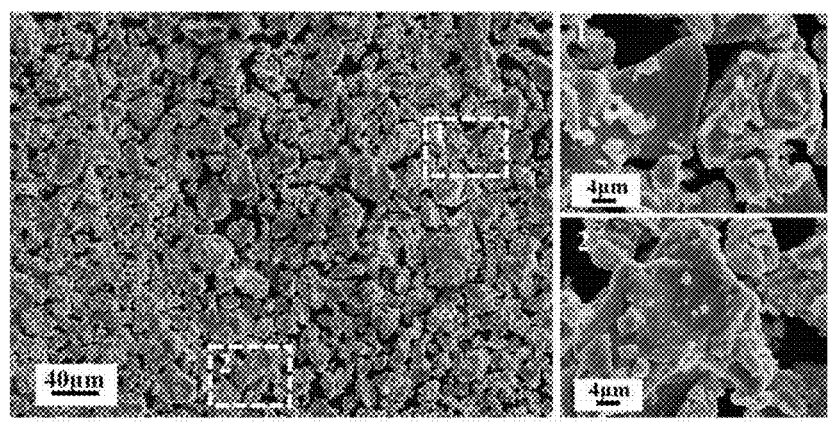
FIG. 2 is the SEM image of the original titanium powders.
Figure 3:
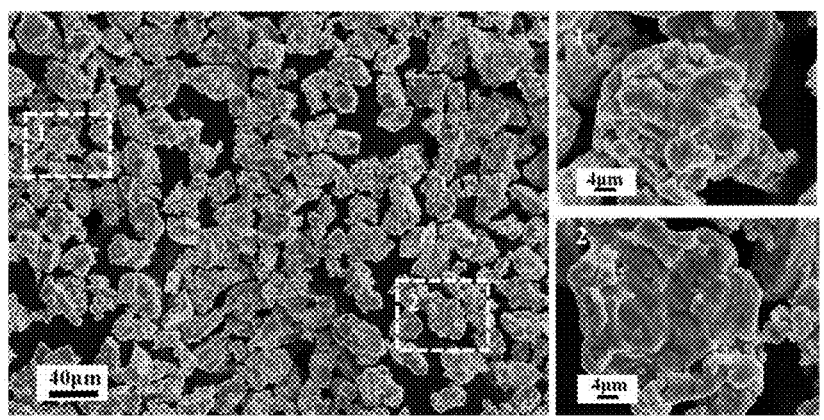
FIG. 3 is the SEM image of the titanium powders after the fluidization treatment in embodiment 1.

20 g of hydrogenated-dehydrogenated irregularly-shaped titanium powders with an average particle size of 30 μm (the SEM image is shown in FIG. 2) is weighed and added into a fluidized bed reactor. Ar gas is introduced from the air inlet at the lower end of the fluidized bed reactor at the flow rate of 0.5 L/min for 30 min to remove the air in the fluidized bed reactor to prevent the oxidation of the titanium powders. The fluidized bed reactor is heated to 450° C. and the Ar gas is introduced at the flow rate of 1 L/min. After the fluidization, the fluidized bed reactor is held at 450° C. for 10 min. Subsequently, the reactor is removed and cooled for 10 min, and then the powder is removed and vacuum packaged. The morphology (see FIG. 3) of the hydrogenated-dehydrogenated titanium powders after the fluidization is observed and the flowability and oxygen content thereof are measured. The oxygen increment of the powders is the oxygen content difference between the treated powders and untreated powders. The results are shown in Table 1. The flowability is measured by using a Hall flowmeter funnel (5 mm in diameter), and the oxygen content is measured with an inert gas fusion-infrared and thermal conductivity method. After the modifying by fluidization, the oxygen increment of the titanium powders is extremely low, and the flowability meets the requirements of powder metallurgy near-net-shape forming processes such as 3D printing and injection molding.

Embodiment 2

50 g of hydrogenated-dehydrogenated irregularly shaped titanium powders with an average particle size of 80 μm is weighed and added into a fluidized bed reactor. Ar gas is introduced from the air inlet at the lower end of the fluidized bed reactor at a flow rate of 1 L/min for 10 min to remove the air in the fluidized bed reactor in order to prevent the oxidation of titanium powders. The fluidized bed reactor is heated to 500° C., and the Ar gas is introduced at the flow rate of 2 L/min. After the fluidization, the fluidized bed reactor is held at 500° C. for 20 min. Subsequently, the reactor is removed and cooled for 30 min, and then the powders are removed and vacuum packaged. The morphology of the hydrogenated-dehydrogenated titanium powders, after the fluidization is observed and the flowability and oxygen content thereof are measured. The oxygen increment of the powders is the oxygen content difference between the treated powders and untreated powders. The results are shown in Table 1. The flowability is measured by using a Hall flowmeter funnel (5 mm in diameter), and the oxygen content is measured with an inert gas fusion-infrared and thermal conductivity method. After the modifying treatment by fluidization, the oxygen increment of the titanium powders is merely 0.16 wt. %, and the flowability meets the requirements of the powder metallurgy near-net-shape forming processes such as 3D printing and injection molding.

Embodiment 3

Figure 4:
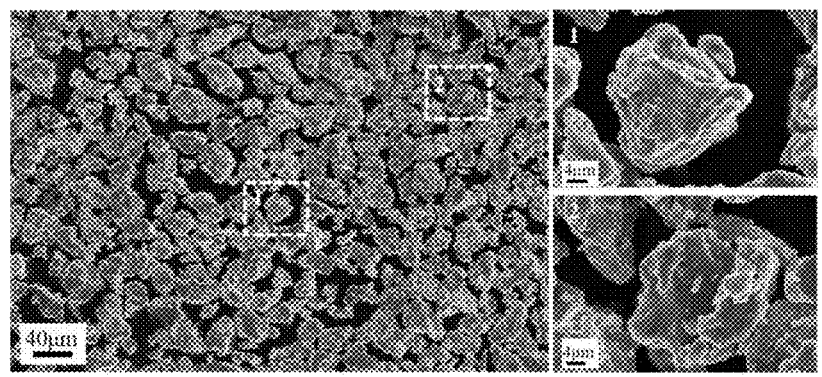
FIG. 4 is SEM image of the titanium powders after the fluidization treatment in embodiment 3.

200 g of hydrogenated-dehydrogenated irregularly shaped titanium powders with an average particle size of 40 μm is weighed and added into a fluidized bed reactor. $H_2$ gas is introduced from the air inlet at the lower end of the fluidized bed reactor at the flow rate of 0.8 L/min for 40 min to remove the air in the fluidized bed reactor to prevent the oxidation of the titanium powders. The fluidized bed reactor is heated to 550° C. and the $H_2$ gas is introduced at the flow rate of 5 L/min. After the fluidization, the fluidized bed reactor is held at 550° C. for 60 min. Subsequently, the reactor is removed and cooled for 25 min. Then the powder is taken out and vacuum packaged. The morphology (See FIG. 4) of the hydrogenated-dehydrogenated titanium powders, after the fluidization is observed, and the flowability and oxygen content thereof are measured. The oxygen increment of the powders is the oxygen content difference between the treated powders and untreated powders. The results are shown in Table 1. The flowability is measured by using a Hall flowmeter funnel (5 mm in diameter), and the oxygen increment is measured with an inert gas fusion-infrared and thermal conductivity method. After the modifying treatment by fluidization, the oxygen increment of the titanium powders is relatively high, but the flowability meets the requirements of powder metallurgy near-net-shape forming processes such as 3D printing and injection molding.

Embodiment 4

200 g of hydrogenated-dehydrogenated irregularly shaped titanium powders with an average particle size of 120 μm is weighed and added into a fluidized bed reactor. $H_2$ gas is introduced from the air inlet at the lower end of the fluidized bed reactor at the flow rate of 1 L/min for 40 min to remove the air in the fluidized bed reactor to prevent the oxidation of titanium powders. The fluidized bed reactor is heated to 600° C., and the $H_2$ gas is introduced at the flow rate of 3 L/min. After the fluidization is performed, the fluidized bed reactor is held at 600° C. for 70 min. Subsequently, the reactor is removed and cooled for 30 min, and then the powders are removed and vacuum packaged. The morphology of the hydrogenated-dehydrogenated titanium powders, after the fluidization is observed, the flowability and oxygen content thereof are measured. The oxygen increment of the powders is the oxygen content difference between the treated powders and untreated powders. The results are shown in Table 1. The flowability is measured by using a Hall flowmeter funnel (5 mm in diameter), and the oxygen increment is measured with an inert gas fusion-infrared and thermal conductivity method. After the modifying treatment by fluidization, the oxygen increment of the titanium powders is relatively high, but the flowability meets the requirements of powder metallurgy near-net-shape forming processes such as 3D printing and injection molding.

What is claimed is:

1. A method based on fluidizing for modifying and preparing titanium powders for 3D printing, comprising the following steps:
   (1) adding a raw material comprising hydrogenated-dehydrogenated irregularly-shaped titanium powders to a fluidized bed reactor, and introducing a predetermined amount of Ar or $H_2$ gas into the fluidized bed reactor from bottom to top to remove air in the fluidized bed reactor and provide a gas protective environment for the raw material;
   (2) after the air in the fluidized bed reactor is removed, transferring the fluidized bed reactor to a heating system for fluidization, and during the fluidization, continuously introducing a stable flow of the Ar or $H_2$ gas, heating the fluidized bed reactor to a constant temperature for the fluidization, and holding the fluidized bed reactor at the constant temperature for a predetermined time, wherein collision and friction occur among the hydrogenated-dehydrogenated irregularly-shaped titanium powders at the constant temperature in an Ar or $H_2$ protective atmosphere, thereby modifying the hydrogenated-dehydrogenated irregularly-shaped titanium powders, modifying a surface morphology and a particle size distribution of the raw material; and
   (3) after the fluidization is completed, removing the fluidized bed reactor from the heating system, continuously introducing the stable flow of the Ar or $H_2$ gas into the fluidized bed reactor, cooling the fluidized bed reactor in atmospheric air, and when the fluidized bed reactor is cooled, stopping introduction of the Ar or $H_2$ gas, and collecting the titanium powders in a hopper;
   wherein, a flow rate of the stable flow of the Ar or $H_2$ gas in step (2) is 0.5-1.5 L/min;
   wherein, the constant temperature is 300-700° C., and the predetermined time to perform the fluidization is 5-90 min;
   wherein, the flowability of the achieved titanium powders is better than 30 s/50 g.

* * * * *